(12) United States Patent
Shoji et al.

(10) Patent No.: US 6,297,723 B1
(45) Date of Patent: Oct. 2, 2001

(54) TEMPERATURE SENSOR AND METHOD OF MANUFACTURING THE SAME

(75) Inventors: Rihito Shoji; Takashi Tamai; Katsunori Matsubara; Kiyoshi Saitou, all of Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/380,952

(22) PCT Filed: Jan. 8, 1999

(86) PCT No.: PCT/JP99/00044

§ 371 Date: Dec. 27, 1999

§ 102(e) Date: Dec. 27, 1999

(87) PCT Pub. No.: WO99/35475

PCT Pub. Date: Jul. 15, 1999

(30) Foreign Application Priority Data

Jan. 8, 1998 (JP) .................................................. 10-2005
Feb. 4, 1998 (JP) ................................................ 10-22886

(51) Int. Cl.[7] ..................................................... H01C 7/02
(52) U.S. Cl. ............................. 338/28; 338/25; 338/229; 374/185; 374/208; 374/209
(58) Field of Search ................................. 338/25, 28, 30, 338/238, 242, 243, 229; 374/185, 208, 209

(56) References Cited

U.S. PATENT DOCUMENTS

| | | | |
|---|---|---|---|
| 2,599,550 | * 6/1952 | Fraser | 338/25 |
| 3,832,668 | * 8/1974 | Berman | 338/25 |
| 4,442,420 | * 4/1984 | Novak | 338/28 |
| 5,207,765 | * 5/1993 | Eiermann et al. | 338/28 |
| 5,462,359 | * 10/1995 | Reichl et al. | 338/25 |
| 5,610,571 | * 3/1997 | Kuzuoka | 338/25 |
| 5,726,624 | * 3/1998 | Caffee et al. | 338/28 |
| 5,823,680 | * 10/1998 | Kato et al. | 338/28 |
| 5,959,524 | * 9/1999 | Wienand et al. | 338/28 |
| 6,014,073 | * 1/2000 | Torii et al. | 338/25 |

FOREIGN PATENT DOCUMENTS

| | | | |
|---|---|---|---|
| 50-51377 | 9/1973 | (JP) . | |
| 58-86428 | 5/1983 | (JP) . | |
| 58-86428t | * 5/1983 | (JP) | 338/28 |
| 60-35501 | 2/1985 | (JP) . | |
| 60-131432 | 7/1985 | (JP) . | |
| 4-282427 | 10/1992 | (JP) . | |
| 08054291 | 2/1996 | (JP) . | |
| 8-54291 | 2/1996 | (JP) . | |
| WO 96/35932 | 11/1996 | (JP) . | |
| 09126910 | 5/1997 | (JP) . | |
| 9-126910 | 5/1997 | (JP) . | |
| 9-189617 | 7/1997 | (JP) . | |

OTHER PUBLICATIONS

Japanese language search report for Int'l Appln. No. PCT/JP99/00044 dated Mar. 23, 1999.

Copy of Form PCT/ISA/210, Mar 23, 1999.

* cited by examiner

Primary Examiner—Karl D. Easthom
(74) Attorney, Agent, or Firm—Ratner & Prestia

(57) ABSTRACT

A low cost high-performance temperature sensor that can be manufactured of a thin-film temperature detecting element with high yield. The temperature sensor has a metal cylinder (10); a ceramic substrate (2) placed in the metal cylinder and a temperature detecting element (3) and film electrodes (94) connected with the output of the temperature detecting element (3); an inorganic filer (95) for absorbing stress to hold the ceramic substrate (2) inside the metal cylinder (1); and a cap (6), provided on one end of the metal cylinder (1), for protecting the temperature detecting element (30) on the ceramic substrate (2). One end of the ceramic substrate is fixed to a first end of a terminal (27) which is U-shaped, and the terminal includes an expansion and contraction absorbing portion (20) between a first and second end.

23 Claims, 18 Drawing Sheets

US 6,297,723 B1

TEMPERATURE SENSOR AND METHOD OF MANUFACTURING THE SAME

THIS APPLICATION IS A U.S. NATIONAL PHASE APPLICATION OF PCT INTERNATIONAL APPLICATION PCT/JP99/00044.

FIELD OF THE INVENTION

The present invention relates to temperature sensors and methods of manufacturing the same.

BACKGROUND OF THE INVENTION

Among various kinds of sensors heretofore known for detecting temperature, a type of temperature sensor that uses a thin film thermistor element as a temperature-sensing element is disclosed, for example, in Japanese Patent Reissued Publication, No. H08-835932, and the like. FIG. 19 is a schematic cross sectional view depicting a structure of a temperature sensor of such kind. A temperature-sensing element 51 comprises a thin film of sintered ceramic formed on a substrate. Connecting parts for electric resistance of the temperature-sensing element 51 are formed of platinum film, and connected to lead wires 65 and 66 made of platinum. The lead wires 65 and 66 are housed within a metal housing 63 of a cylindrical shape, while being isolated with each other by electrical insulating glasses 61 and 62. The cylindrical metal housing 63 is fixed to a flange 64. The temperature sensor detects temperature electrically as a resistance of the temperature-sensing element 51.

In the case of adapting a sensor of this kind for an exhaust gas purification system of automobile, as has been studied for the purpose of environmental protection, the sensor can constitute a characteristically suitable temperature sensor, including reliability. However, it makes an extremely expensive temperature sensor in respect of cost effectiveness, since it uses platinum wires for the lead wires 65 and 66. Because the platinum wires actually used for one temperature sensor has weighed approximately 0.54 gr, the temperature sensor has cost approximately 800 yen for the platinum alone based on the platinum price (approx. 1,500 yen/gr) as of July, 1997. The prior art techniques thus have had a problem of making temperature sensors very expensive.

SUMMARY OF THE INVENTION

The present invention is intended to solve the above-cited problem of the prior art, and aims at providing a low-cost high-performance temperature sensor with high yield.

In order to solve the above-cited problem, a temperature sensor of the present invention includes: (a) a metal cylinder; (b) a ceramic substrate inserted in the metal cylinder, and provided with a temperature detecting element in a form of film and electrodes in a form of film for electrically tapping off an output of the temperature detecting element; (c) a supporting means having a function of reducing stress for supporting the ceramic substrate in the metal cylinder; and (d) a protective cap provided on one end of the metal cylinder for protecting the temperature detecting element provided on the ceramic substrate.

The above structure is able to realize a low-cost high-performance temperature sensor with high yield.

DESCRIPTION OF THE REFERRED EMBODIMENTS

First Exemplary Embodiment

A first exemplary embodiment of the present invention is described hereinafter by referring to FIG. 1 through FIG. 5.

Figure 1:
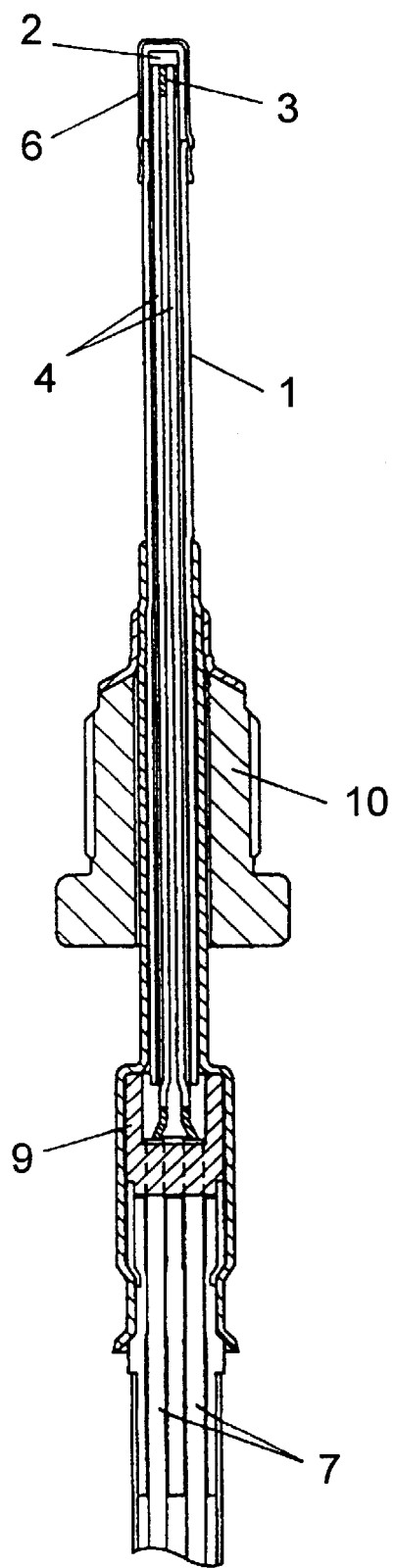
FIG. 1 is a schematic cross sectional view depicting a structure of a temperature sensor of a first exemplary embodiment of the present invention.
Figure 2:
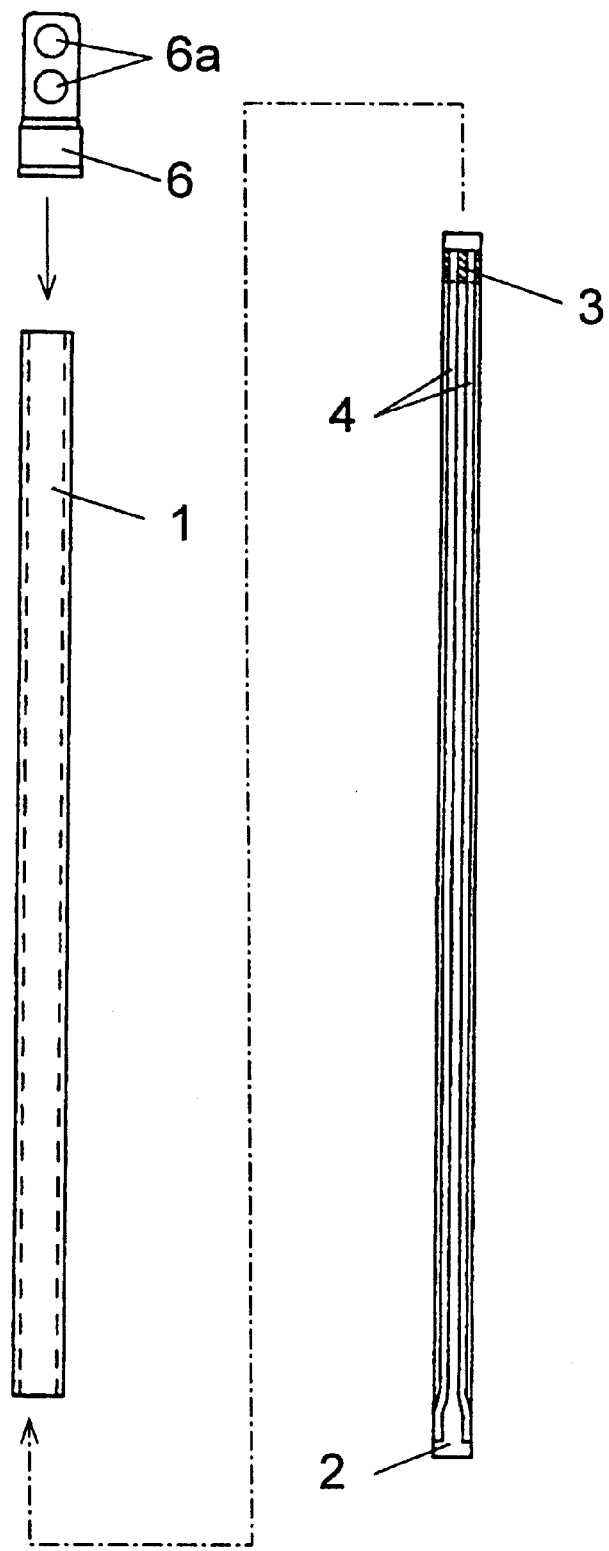
FIG. 2 is a schematic view depicting a temperature detecting portion of the same temperature sensor.
Figure 3:
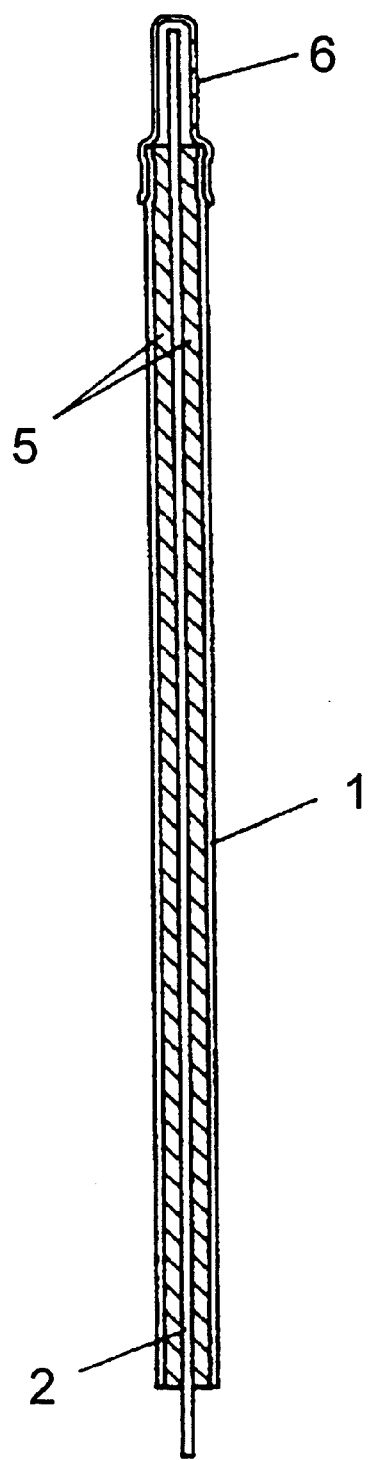
FIG. 3 is a cross sectional view depicting the temperature detecting portion of the same temperature sensor.
Figure 4:
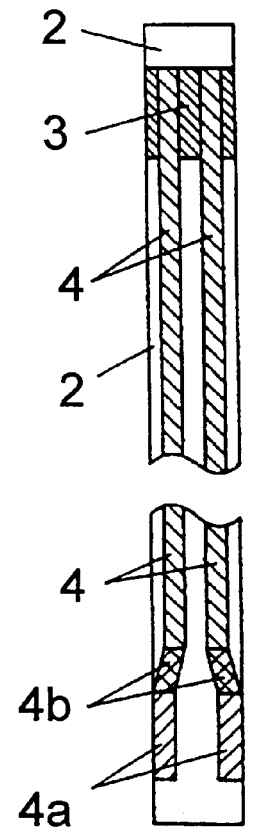
FIG. 4 is an enlarged view depicting an electrode portion of the same temperature sensor.

FIG. 1 through FIG. 3 respectively depict a schematic cross sectional view of a structure of a temperature sensor of the first exemplary embodiment of the present invention, a schematic view depicting a temperature detecting portion of the temperature sensor of FIG. 1, and a cross sectional view of the temperature detecting portion of FIG. 2 after the fabrication. In FIG. 1 through FIG. 3, same elements were assigned the same reference numerals. A reference numeral 1 represents a metal cylinder made of heat resistant stainless steel having an outer diameter of 3 mm and a thickness of 0.4 mm, in which a ceramic substrate 2 made of alumina having a length longer than the metal cylinder 1 is inserted. A tip portion of the ceramic substrate 2 is provided with a temperature detecting element 3 in a form of film formed by a CVD method. The temperature detecting element 3 used in this exemplary embodiment was a thermistor composed of an oxide-composite of Al, Cr and Fe. The temperature detecting element 3 is provided with a pair of electrodes 4 in a form of film formed on its surface for electrically detecting a resistance. The electrodes 4 were formed by printing and sintering platinum paste in this exemplary embodiment. An enlarged view of the electrodes 4 is shown in FIG. 4. Connecting portions of the electrodes, or portions to be soldered, are shown as electric conductors 4a containing glass, which was formed by printing and sintering only conductive paste of silver-palladium containing glass. The electrodes 4 constructed of platinum paste and the electric conductors 4a containing glass share overlapped portions 4b with each other. Inorganic filler 5, which serves as a supporting means having a function of reducing stress, is filled in a space between the metal cylinder 1 and the ceramic substrate 2. The inorganic filler 5 was formed by injecting a predetermined amount of filling material of pasty form containing silica and $Li_2O$ besides a chief ingredient of alumina, with a dispenser, in the space between the metal cylinder 1 and the ceramic substrate 2, followed by hardening at 150° C. A protective cap 6 made of nickel-chromium alloy is inserted, crimped and welded to the metal cylinder over a portion of the temperature detecting element 3 formed on the ceramic substrate 2, in order to protect the temperature detecting element 3. The protective cap 6 is provided with two holes 6a as shown in FIG. 2.

Figure 5:
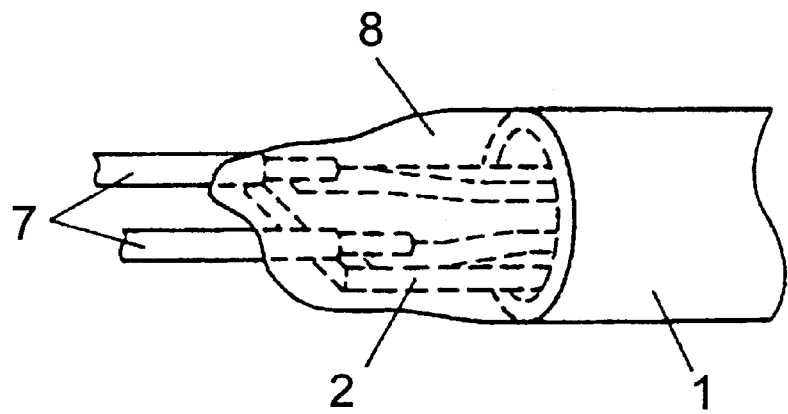
FIG. 5 is a perspective view depicting the electrode portion of the same temperature sensor.

The electric conductors 4a containing glass are connected by soldering to lead wires 7 covered by Teflon resin, and the soldered portions are totally molded with polyimide resin 8 in a such manner to also cover a portion of the lead wires 7. The foregoing configuration is shown in FIG. 5. The lead wires 7 are additionally secured by an insulator 9 composed of glass fiber-reinforced resin. 10 represents a nut attached to an outer periphery of the metal cylinder 1 for a purpose of mounting the temperature sensor.

Detection of a temperature was made electrically as a change in resistance value of the temperature detecting element 3 to the temperature. A prototype temperature sensor having the foregoing structure was built, and evaluated for its output characteristics. As a result, it was confirmed that the prototype exhibits an equivalent performance with the prior art device for not only the principal characteristic of change in resistance to temperature, but also reliability. The prototype also attained an improvement of 30 to 40% in responsivity as compared to the prior art device. This improvement is attributed to the holes 6a provided in the protective cap 6, which conduct the change in temperature directly to the temperature detecting element 3. In regard to the cost, the prototype could also realize a substantial reduction to one twentieth or less as compared to the platinum wires (approx. 800 yen) of the prior art device, since it uses approx. 0.01 g of the platinum paste, which costs approx. 35 yen as calculated based on price of the platinum paste (approx. 3,500 yen/gr).

Although the described exemplary embodiment used the inorganic filler 5 containing silica and $Li_2O$ besides the chief ingredient of alumina, it could be a single substance such as alumina or silica, or zirconia. Or, it could be a combination of them. This is for a reason that any of the foregoing substances have properties of good electrical insulation as well as good supporting capability for the ceramic substrate 2 under a high temperature environment. Further, a reason for the addition of $Li_2O$ into the inorganic filler 5 is to suppress foaming during hardening of the filler, thereby achieving a dense filling.

Although the described exemplary embodiment used polyimide to form the resin 8, it could be replaced with silicone. Silicone can reduce stress due to a difference in temperature coefficient of thermal expansion from the ceramic substrate 2 and the lead wires 7, so as to further improve a strength against thermal shock than the one using polyimide.

Furthermore, although the described exemplary embodiment used silver-palladium system paste for the electric conductors 4a containing glass, quite an equivalent performance was attained with silver-palladium-platinum system. Also, while a thermistor was used for the temperature detecting element 3, it could be a platinum. The platinum has an advantage of reducing the manufacturing process, because it can be formed together with the electrodes 4, although it has a lower ratio of change in resistance to temperature than thermistor. A suitable type of the temperature detecting element may be chosen according to an individual use application.

Accordingly, the present exemplary embodiment could realize a temperature sensor of high output performance and low cost.

Second Exemplary Embodiment

Since a temperature sensor of a second exemplary embodiment of the present invention has many structural elements in common with that of the first exemplary embodiment, same elements are assigned the same reference numerals and detailed descriptions will be omitted. In short, the present exemplary embodiment is characterized by employing cap-shaped supporting bodies to secure a ceramic substrate 2, instead of using an inorganic filler 5 as supporting means having a stress-reducing function. A temperature sensor actually fabricated of this structure will be described hereinafter.

Figure 6:
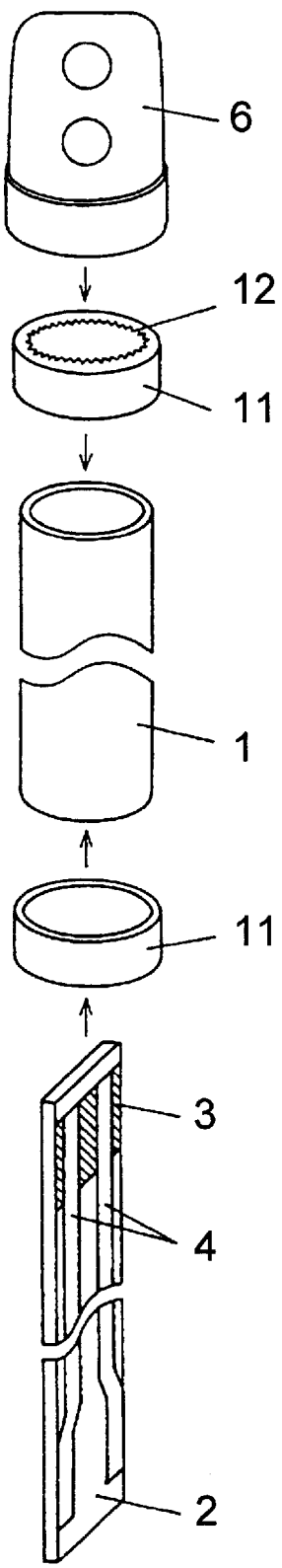
FIG. 6 is an exploded perspective view depicting a temperature detecting portion of a temperature sensor of a second exemplary embodiment of the present invention.
Figure 7:
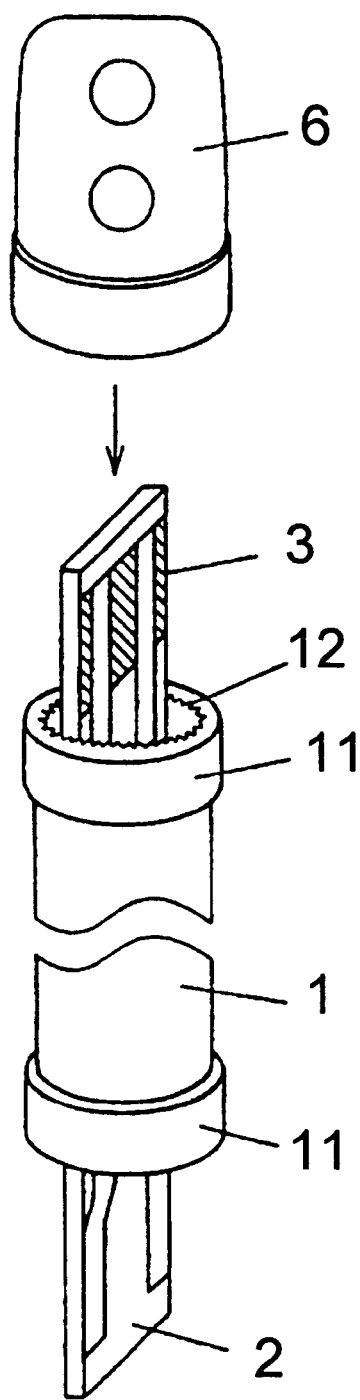
FIG. 7 is a perspective view depicting the temperature detecting portion of the same temperature sensor.
Figure 8:
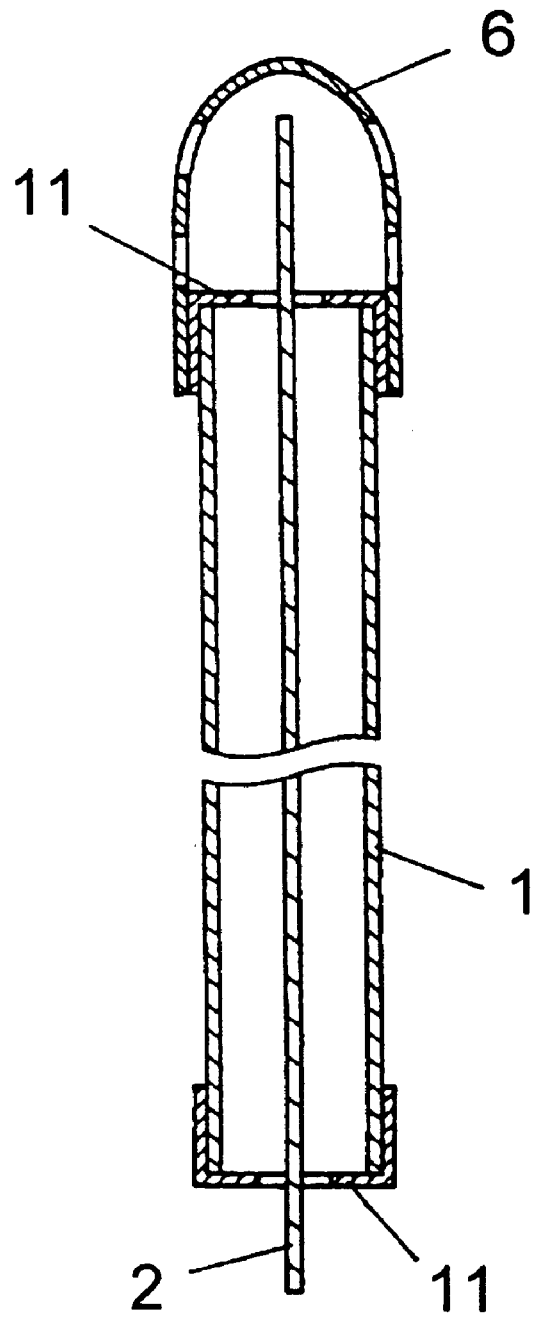
FIG. 8 is a cross sectional view depicting the temperature detecting portion of the same temperature sensor.

FIG. 6 through FIG. 8 respectively depict an exploded perspective view of a temperature detecting portion of the temperature sensor of FIG. 1, a perspective view of the temperature detecting portion in the process of the fabrication, and a cross sectional view of the same portion of FIG. 7. A reference numeral 11 represents the cap-shaped supporting body made of nickel-chromium alloy for use as the supporting means having a stress-reducing function. The supporting bodies 11 are formed in a cylindrical shape with a bottom by a press-stamping, as shown in FIG. 6, and a bottom surface of it is bored a hole 12 in a shape having a plurality of projections and depressions. The supporting bodies 11 were inserted, crimped and welded to each end of a metal cylinder 1. During this process, a protective cap 6 was inserted over an outer periphery of one of the supporting bodies 11, so that both of them were crimped and welded at the same time. A ceramic substrate 2 is inserted into the hole 12 having the shape of projections and depressions provided in the supporting bodies 11, as shown in FIG. 7. The holes 12 having the shape of projections and depressions bored in the supporting bodies 11 have a distinctive feature of improving productivity because the ceramic substrate 2 can be inserted from any direction. They can also hold the ceramic substrate 2 securely against vibrations, since one of the projections and depressions of each supporting body 11 maintains a contact with the ceramic substrate 2 in directions of thickness and width at all times, while allowing the ceramic substrate 2 to expand freely into a longitudinal direction of the substrate due to a difference in coefficient of thermal expansion between the metal cylinder 1 and the ceramic substrate 2 as the temperature increases. In a word, the holes 12 also have a feature of securing the ceramic substrate 2 in a manner that the ceramic substrate 2 is movable in the longitudinal direction, but not movable in the directions of thickness and width of the substrate.

It was confirmed that the temperature sensor manufactured as above exhibits a good output performance and reliability in the same degree as that of the first exemplary embodiment, and also realizes quick responsivity. The sensor could also achieve a cost reduction in the same way as that of the first exemplary embodiment, since it did not use expensive platinum wires, as is needless to note.

Besides, the present exemplary embodiment has a feature of not requiring a filling and hardening step as compared to the first exemplary embodiment, since it does not use inorganic filler.

Accordingly, the foregoing structure could realize a temperature sensor of high output performance and low cost.

Third Exemplary Embodiment

A third exemplary embodiment of the present invention will be described hereinafter by referring to FIG. 9 through FIG. 15

Figure 9:
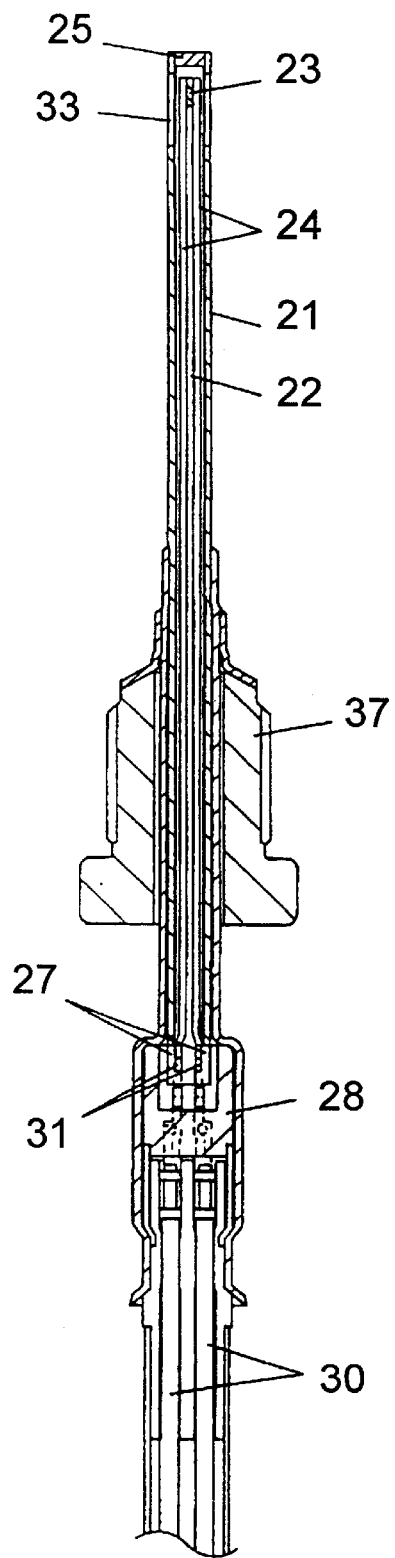
FIG. 9 is a schematic cross sectional view depicting a structure of a temperature sensor of a third exemplary embodiment of the present invention.
Figure 10:
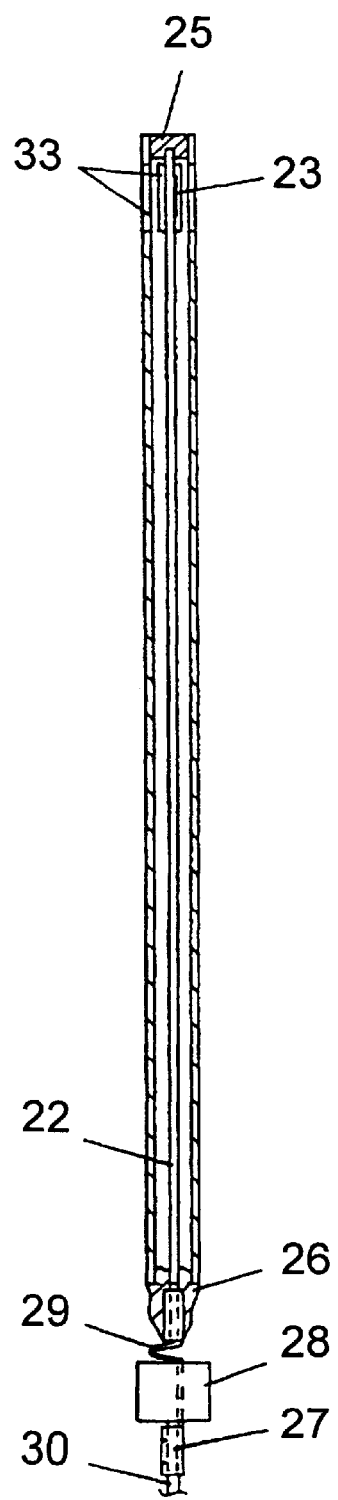
FIG. 10 is a cross sectional view depicting a temperature detecting portion of the same temperature sensor.

FIG. 9 is a schematic cross sectional view depicting a structure of a temperature sensor of the third exemplary embodiment of the present invention, and FIG. 10 is a cross sectional view depicting a temperature detecting portion of the same temperature sensor.

A reference numeral 21 represents a metal cylinder which is made of heat resistant stainless steel having an outer diameter of 3 mm and a thickness of 0.4 mm and provided with openings at the tip side and the hinder side. A long ceramic substrate 22 made of alumina having a thickness of 0.5 mm, a width of 2 mm and a length of 70 mm is placed in the metal cylinder 21. A tip side of the ceramic substrate 22 is provided with a film-like temperature detecting element 23 formed by a CVD method. The temperature detecting element 23 used in this exemplary embodiment was a thermistor made of an oxide composite of Al, Cr and Fe, with a length of 2 mm and a width of 1.5 mm. The temperature detecting element 23 is connected on its surface with a pair of electrodes 24 in a pattern form for electrically detecting a resistance. The electrodes 24 in this exemplary embodiment were formed by printing and sintering platinum paste from the tip side to the hinder side of the ceramic substrate 22, with their width and pattern space arranged to be 0.5 mm each.

The tip side of the ceramic substrate 22 is secured by covering an interior of the tip of the metal cylinder 21 with inorganic filler 25 which serves as a supporting means having a function of reducing stress. The inorganic filler 25 used here was a pasty form containing silica and Li$_2$O, in addition to a chief ingredient of alumina, and it was placed in a such manner that the tip end of the ceramic substrate 22 locates within it.

The hinder side of the ceramic substrate 22 was supported by adhering it to a hinder end of the metal cylinder 21 with a resilient body 26 composed of silicone which serves as a supporting means having a function of reducing stress.

Figure 11:
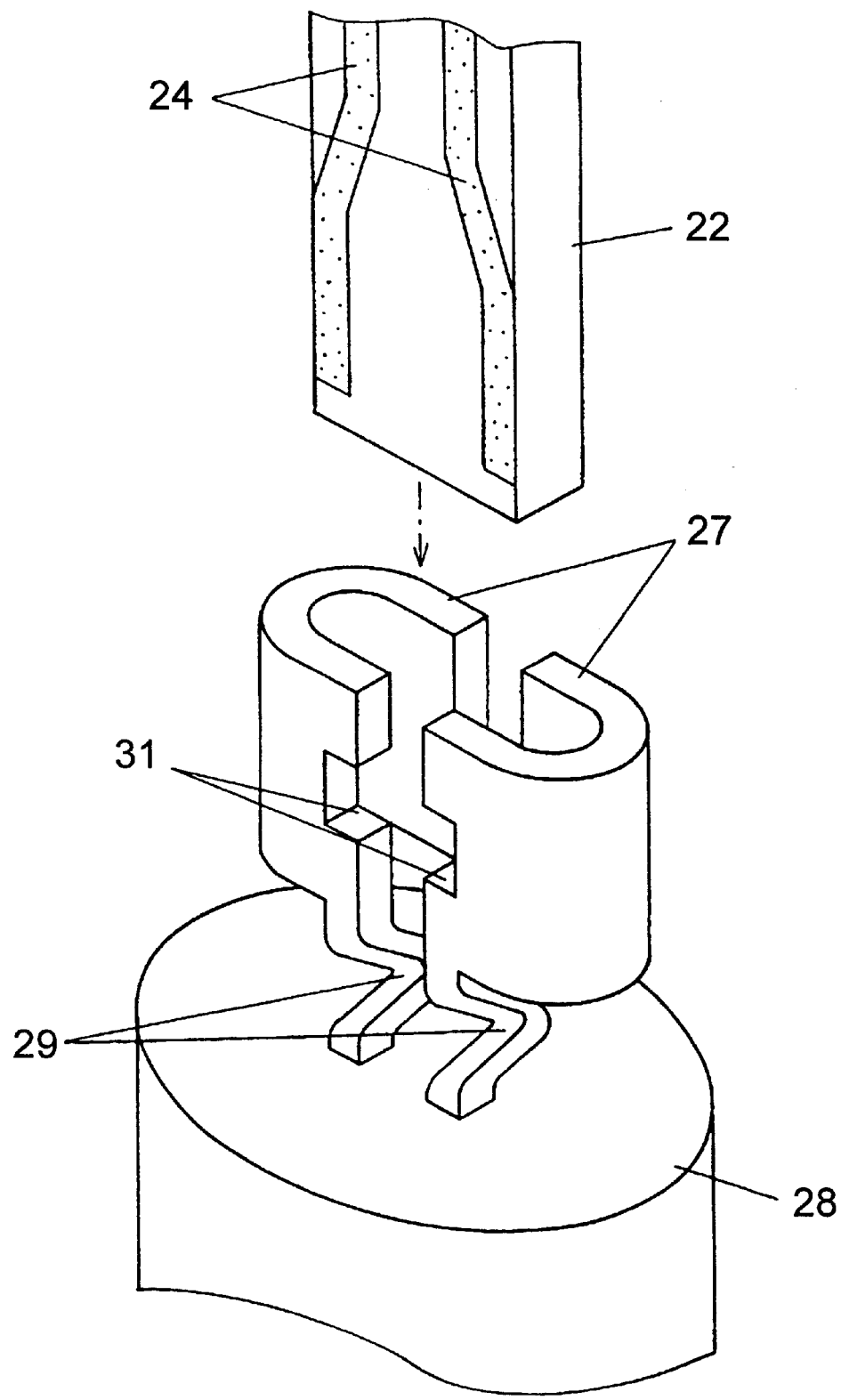
FIG. 11 is a perspective view depicting an appearance of the same temperature sensor in a process of inserting a substrate into terminals.

FIG. 11 is a perspective view depicting an appearance of the same temperature sensor in a process of inserting the ceramic substrate 22 into terminals 27. In FIG. 11, terminals 27, each of which is made of stainless steel of 0.3 mm thick with a nickel-plated surface, and provided with a tip end in a cross sectional shape of letter U, are fixed to hinder ends of the electrodes 24 by way of inserting the ceramic substrate 22 into a space formed by the shape of letter U.

In the present exemplary embodiment, although the terminals 27 were described as having a cross-sectional shape of letter U, they could be of a shape of the letter U with angled corners. A suitable shape may be chosen according to an ease of fabrication. The terminals 27 are secured at their hinder ends in a retainer 28 formed of glass fiber-reinforced resin. The terminals 27 and the retainer 28 were integrally formed by injection molding. Each terminal 27 is also provided at its middle portion with an expansion-and-contraction absorber 29 having a curved shape with a width of 0.3 mm.

Each terminal 27 is connected with a lead wire 30 at its hinder end by welding. The welding was adopted in order to gain a sufficient strength against tension of the lead wire 30.

Figure 12:
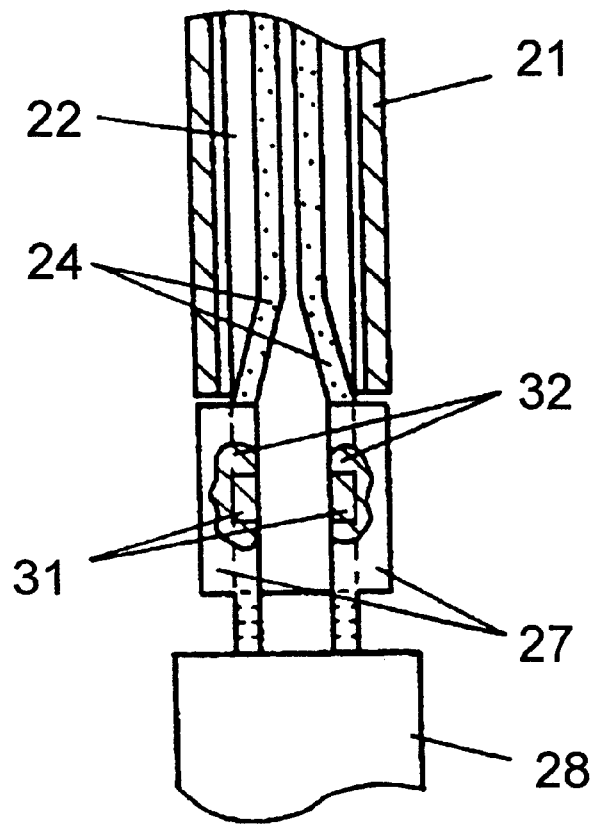
FIG. 12 is an enlarged cross sectional view depicting a connecting portion between a conductive pattern and terminals of the same temperature sensor.

Each terminal 27 is provided with a square-shaped notch 31 at a portion of the tip end. An electrical connection to the electrode 24 is attained by soldering the notched portion with solder 32 of high melting point. An enlarged cross sectional view of the connecting portion is shown in FIG. 12. Reliable connections can be realized between the terminals 27 and the electrodes 24 because of the notches 31, which provide for secure bonding of the solder 32 to the electrodes 24, and the nickel-plated surfaces of the terminals 27, which provide for secure bonding of the solder 32 to the terminals 27.

Openings 33 are provided at four locations of the metal cylinder 21 corresponding with the temperature detecting element 23, and in a such manner that they locate symmetrically to one another. The openings 33 are sized 5 mm long by 1.7 mm wide, which is larger than an area (2 by 1.5 mm) of the temperature detecting element 23. A reference numeral 37 represents a nut attached to an outer periphery of the metal cylinder 21 for a purpose of mounting the temperature ceramic.

Figure 13:
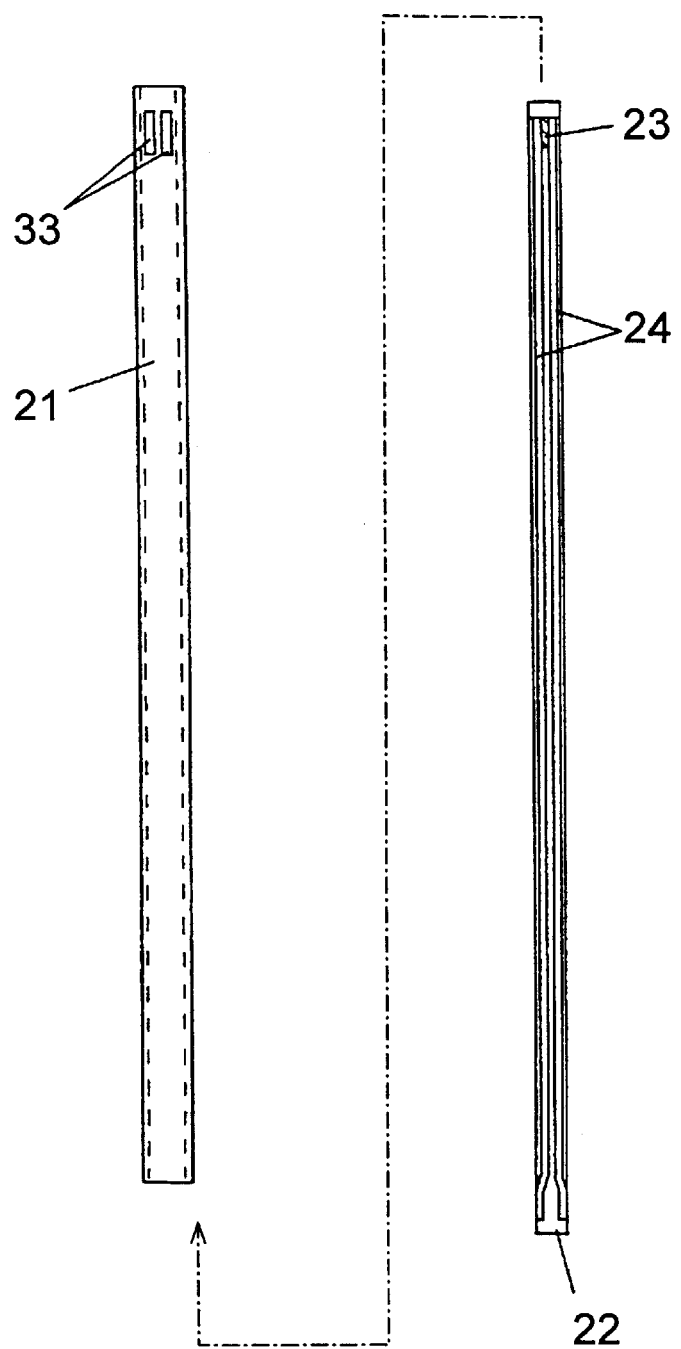
FIG. 13 is an exploded front view depicting a temperature detecting portion of the same temperature sensor.
Figure 14:
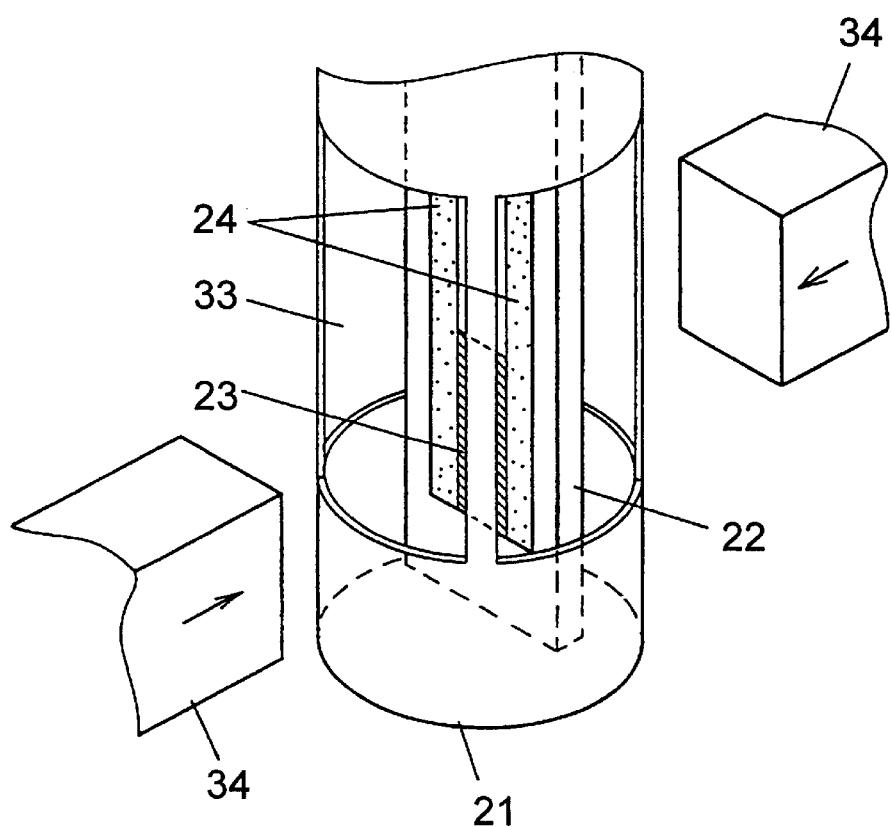
FIG. 14 is a perspective view depicting a process of fixing a substrate with a substrate fixing jig in a method of manufacturing the same temperature sensor.

A method of manufacturing a temperature detecting portion will be described. FIG. 13 is an exploded front view depicting the ceramic substrate 22 provided with the temperature detecting element 23 and the electrodes 24, and the metal cylinder 21 provided with the openings 33. First, the ceramic substrate 22 is inserted into the metal cylinder 21 in a direction of an arrow shown in FIG. 13. Then, substrate fixing jigs 34 made of Teflon are inserted through the openings 33 in a manner to hold a front and a back of the ceramic substrate 22 between them. FIG. 14 is a perspective view depicting an appearance in this process. The substrate fixing jigs 34 were made to have a cross sectional area of 3 mm long by 1.6 mm wide, which is smaller than the area (5 by 1.7 mm) of the openings 33, but larger than the area (2 by 1.5 mm) of the temperature detecting element 23.

Figure 15:
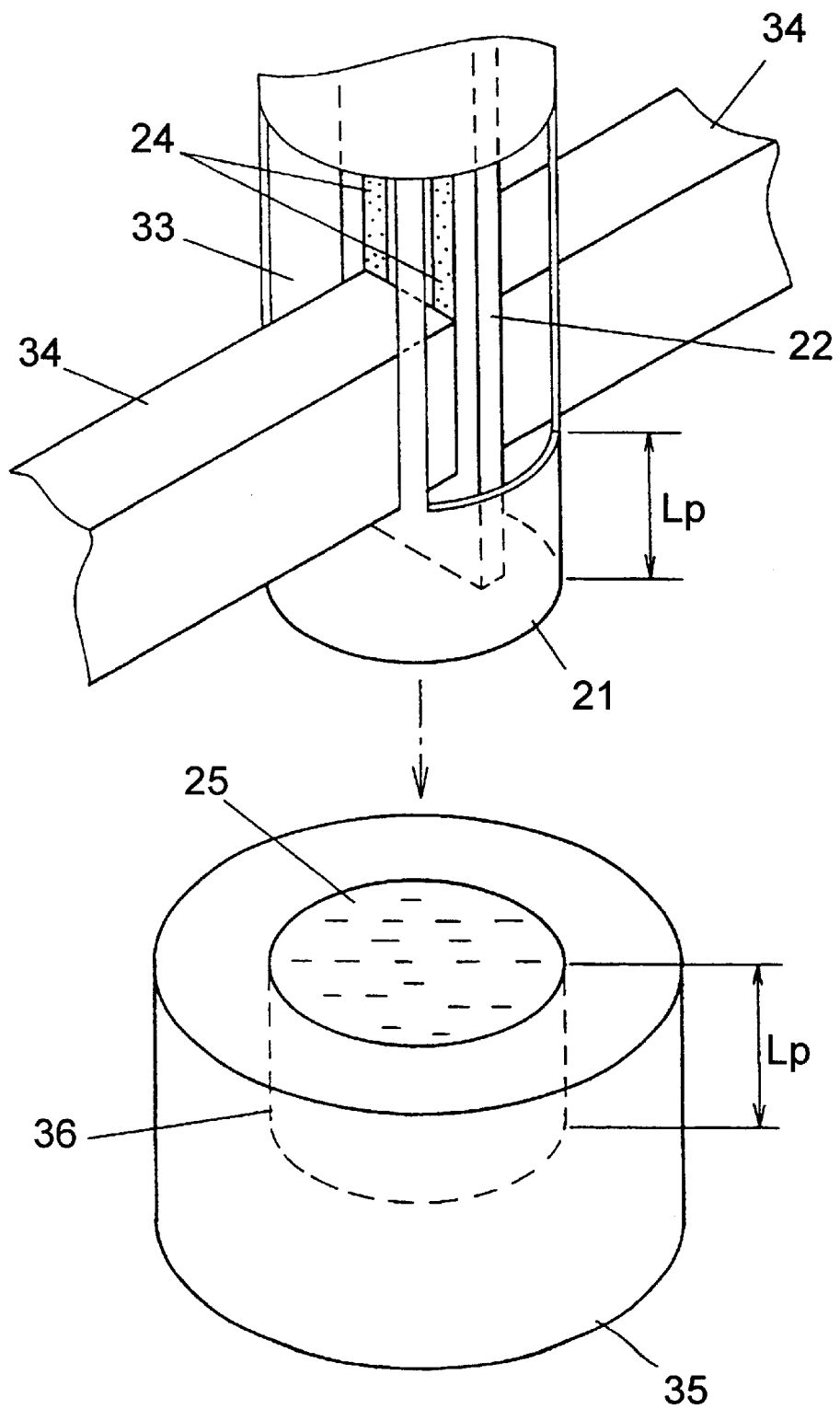
FIG. 15 is a perspective view depicting a process of filling a tip end of a metal cylinder with inorganic filler in the method of manufacturing the same temperature sensor.

Next, inorganic filler 25 is filled into a concavity 36 provided in an inorganic filler hardening jig 35 made of Teflon, as shown in a perspective view of FIG. 15. The concavity 36 was made to have a depth nearly equal to a dimension between a tip of the metal cylinder 21 and a tip end of the openings 33 (denoted as Lp in FIG. 15). Also, a diameter was made to be slightly greater than a diameter of the metal cylinder 21. The tip of the metal cylinder 21 is immersed into the concavity 36, while holding the ceramic substrate 22 with the substrate fixing jigs 34. This allows the inorganic filler 25 to enter into the tip portion of the metal cylinder 21 by an amount determined by the diameter and the depth of the concavity 36.

The inorganic filler 25 is hardened under this condition at 150° C. in a constant temperature oven. The substrate fixing jigs 34 and the inorganic filler hardening jig 35 are removed after the above process. The both jigs 34 and 35 can be removed easily without adhesion of the inorganic filler 25, since they are made of Teflon. The substrate. fixing jigs 34 and the inorganic filler hardening jig 35 can be made of metal for providing a quite equivalent effectiveness, if their surfaces are coated with Teflon.

The above manufacturing method could make only the tip end of the ceramic substrate 22 secured to a generally center position of the metal cylinder 21, without causing the inorganic filler 25 to adhere on the temperature detecting element 23.

Detection of a temperature was made electrically as a change in resistance value of the temperature detecting element 23 in response to the temperature. Ten pieces of prototype temperature sensor having the foregoing structure were built, and evaluated for a rate of yields. The result showed a substantial improvement in yields as compared to that of the prior art structure, as none of the sensors exhibited disconnection. This result is attributed to (a) fixation of the ceramic substrate 22 only at the tip end of the metal cylinder 21, (b) retaining the hinder end with the resilient body 26, and (c) additionally providing the expansion-and-contraction absorbers 29 in the terminals 27. The above structure eliminates stress to the ceramic substrate 22, since the expansion-and-contraction absorbers 29 absorb, through the resilient body 26, expansion and contraction of the ceramic substrate 22 due to a difference in coefficient of thermal expansion between the metal cylinder 21 and the ceramic substrate 22 with changes in temperature. As for the output performance, it was also confirmed that the sensors provide a good resistance-to-temperature characteristic in the same degree as that of the prior art device. They also showed clearly of an extremely good reliability, as there was no disconnection as a result of an endurance test performed under a high temperature and vibrations. The sensors also attained an approximately 40% of speedier response as compared to the prior art device according to a result of evaluation for responsivity. This improvement is attributed to the present structure, in which the temperature detecting element 23 is positioned in the metal cylinder 21, and the metal cylinder 21 is provided with the openings 33 at the tip thereof, whereas the temperature detecting element was housed and protected within a metal cap in prior art structure. The present structure thus transmits directly a change in temperature, which is otherwise transmitted through the cap, to the temperature detecting element 23.

Although the described exemplary embodiment used silicone to form the resilient body 26, it could be replaced with polyimide. Polyimide is effective in constituting a temperature sensor of a higher temperature application, since it is resistant to higher temperature than silicone.

Furthermore, although a thermistor was used as the temperature detecting element 23 in the present exemplary embodiment, it could be platinum. The platinum element has an advantage of reducing the manufacturing process, because it can be formed together with the electrodes 24, although it has a lower rate of change in resistance to temperature than thermistor. A suitable type of the temperature detecting element 23 may be chosen according to an individual use application. In the case of using platinum, a precise measurement of resistance is required, since it has a low rate of change in resistance. However, the sensor can provide a change in resistance of only the temperature detecting element 23, if a four-wire method of measuring resistance is adopted by providing four electrodes 24, because the four-wire method cancels out a change in resistance of the electrodes 24 by the temperature of their own.

Accordingly, the present exemplary embodiment could realize temperature sensors with high yield.

Fourth Exemplary Embodiment

Figure 16:
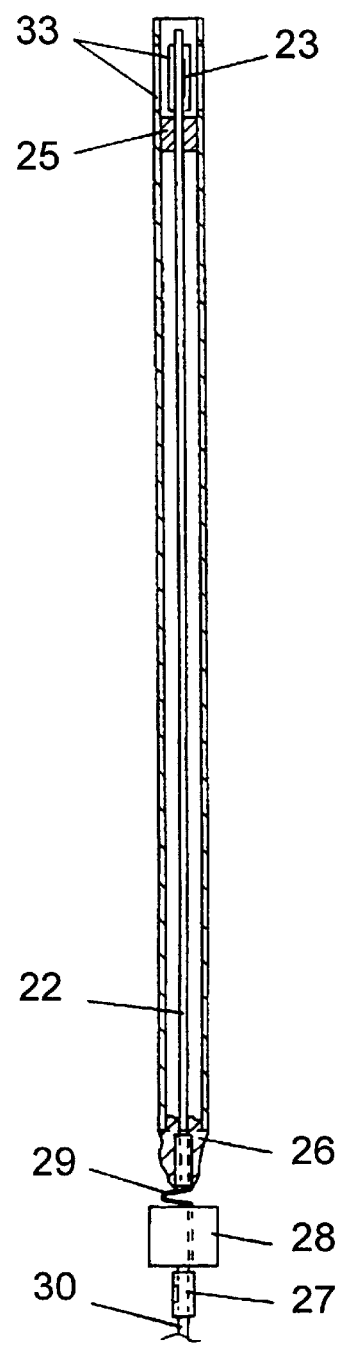
FIG. 16 is a cross sectional view depicting a temperature detecting portion of a temperature sensor of a fourth exemplary embodiment of the present invention.

Since a temperature sensor of a fourth exemplary embodiment of the present invention has many structural elements in common with that of the third exemplary embodiment, as shown in FIG. 16, same elements are assigned the same reference numerals and descriptions will be simplified. In short, the present exemplary embodiment is characterized by employing inorganic filler 25 as a supporting means having a stress-reducing function to secure a ceramic substrate 22 to a metal cylinder 21 at a hinder end of openings 33, instead of securing a tip end of the ceramic substrate 22 with the inorganic filler 25. A temperature sensor actually fabricated of this structure will be described hereinafter.

FIG. 16 is a cross sectional view depicting a temperature detecting portion. The inorganic filler 25 is filled for approximately 2 mm thick from the hinder end of the openings 33, so that this portion secures the ceramic substrate 22 to the metal cylinder 21. The temperature detecting portion was fabricated with a method as described below.

Figure 17:
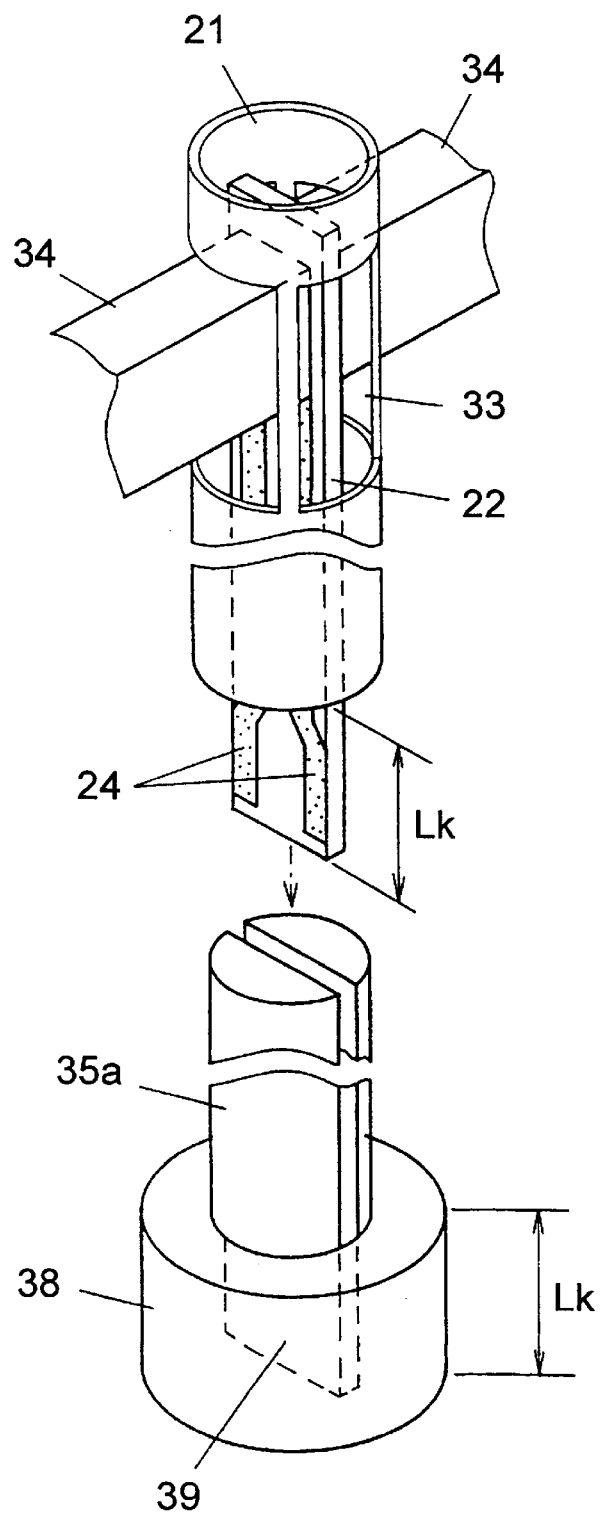
FIG. 17 is a perspective view depicting a process of fixing a substrate with an inorganic filler hardening jig in the method of manufacturing the same temperature sensor.

First, the ceramic substrate 22 is inserted into the metal cylinder 21, as shown in FIG. 13. Then, substrate fixing jigs 34 made of Teflon are inserted through the openings 33 in a manner to hold a front and a back of the ceramic substrate 22 between them. FIG. 17 is a perspective view depicting an appearance in this process. The substrate fixing jigs 34 were made to have the same cross-sectional area as those of the third exemplary embodiment.

Next, an inorganic filler hardening jig 35a in a shape shown in FIG. 17 is inserted from a hinder end of the metal cylinder 21 into spaces between the metal cylinder 21 and a front and a back of the ceramic substrate 22. In this instance, a length of the inorganic filler hardening jig 35a was arranged to be 2 mm shorter than a distance from the hinder end of the metal cylinder 21 to the hinder end of the openings 33. Further, a base 38 of the inorganic filler hardening jig 35a was made to have a hole 39 in a size slightly larger than a cross sectional area of the ceramic substrate 22, and in a depth approximately equal to a length of a protruded portion (denoted as Lk in FIG. 17) from the hinder end of the ceramic substrate 22. The protruded portion of the ceramic substrate 22 is inserted into this hole 39. Because of a shape of the inorganic filler hardening jig 35a, which is not only thin but also long and narrow and intricate, it was made by a process of cutting stainless steel into the shape, and coating with Teflon to form a film on its surface.

Figure 18:
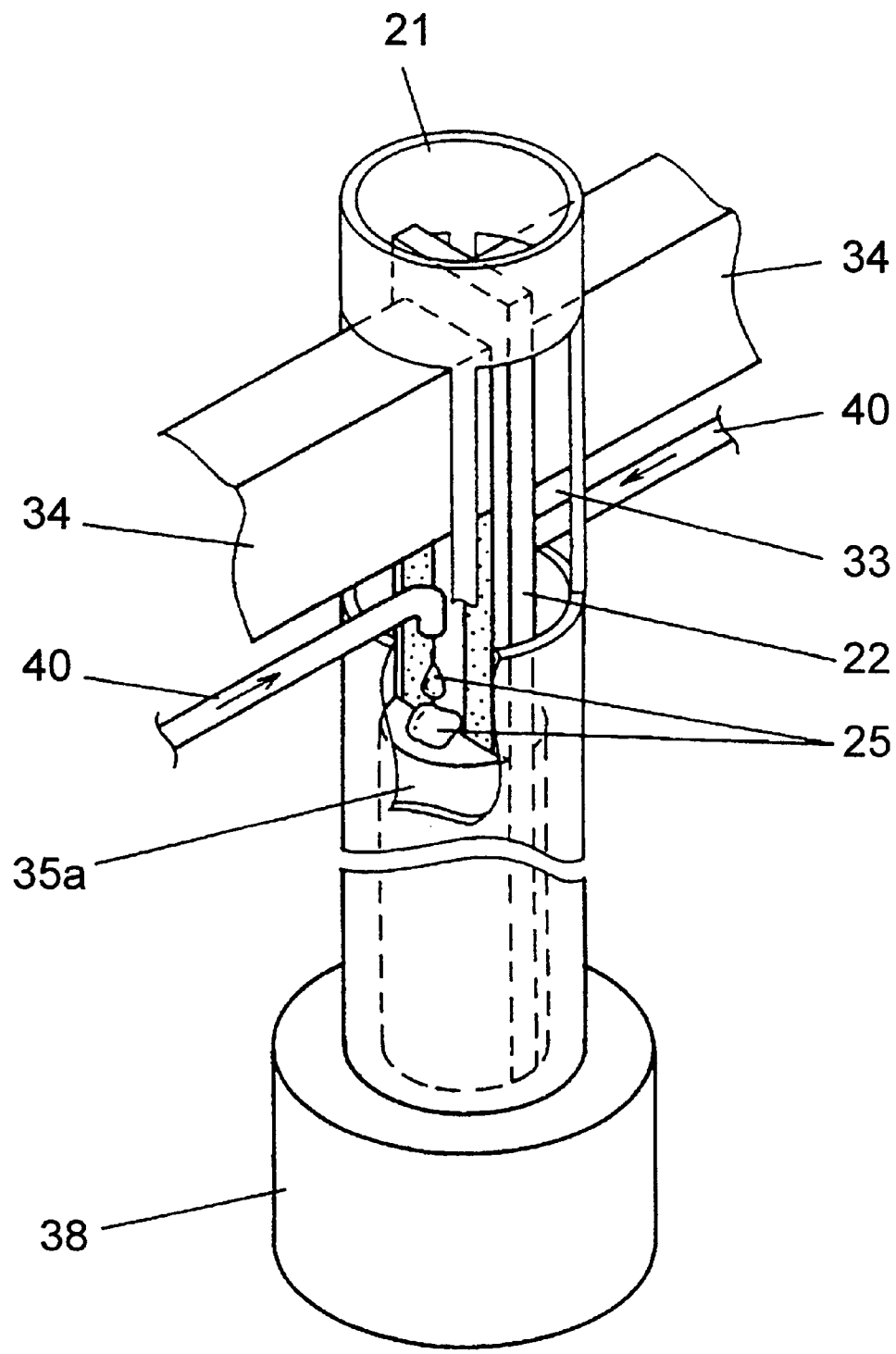
FIG. 18 is a perspective view depicting a process of filling a metal cylinder with inorganic filler in the method of manufacturing the same temperature sensor.
Figure 19:
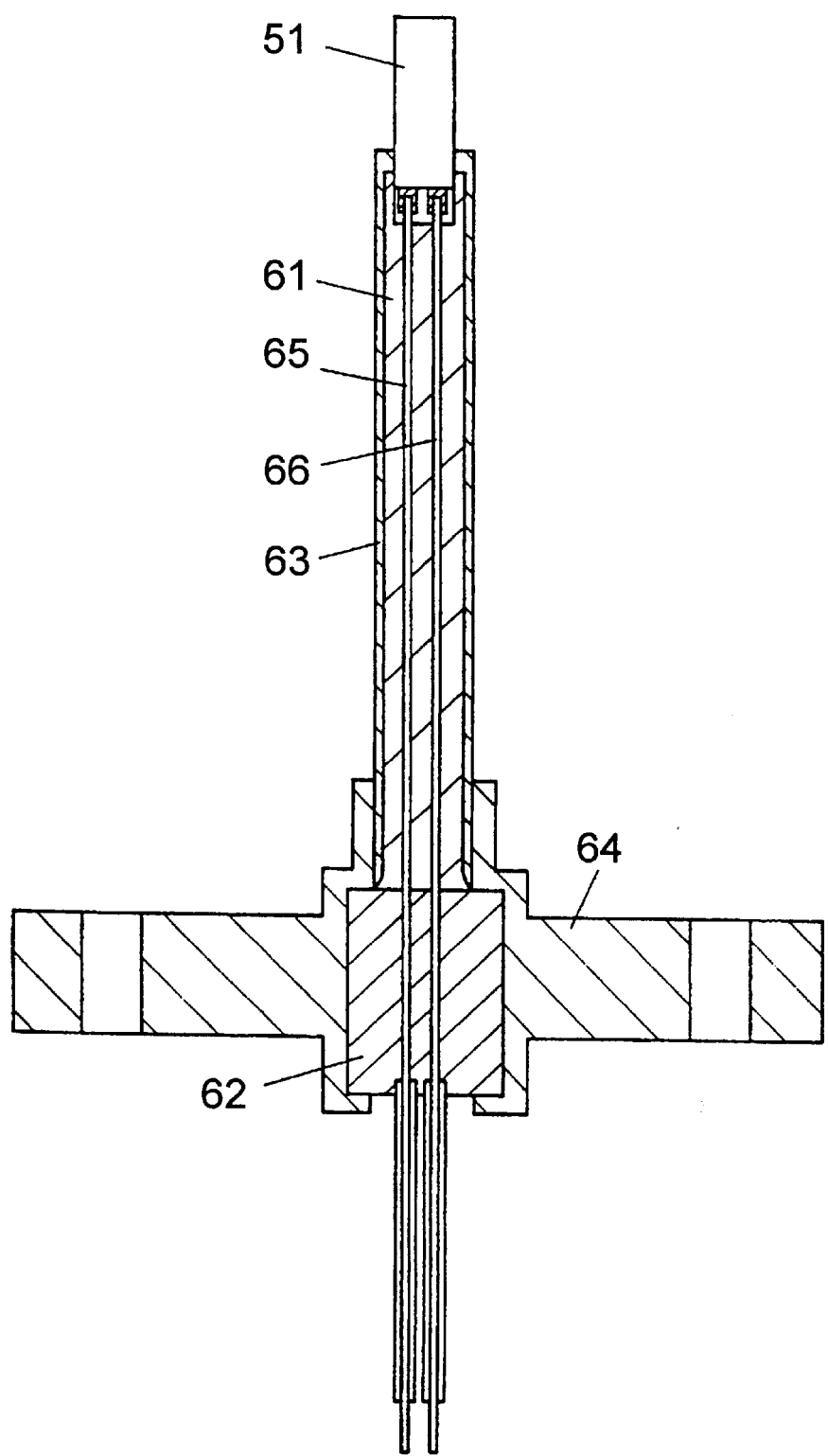
FIG. 19 is a schematic cross sectional view depicting a structure of a temperature sensor of the prior art.

In FIG. 18, the inorganic filler hardening jig 35a is shown as has been inserted into the spaces between the metal cylinder 21 and a front and a back of the ceramic substrate 22. A portion of the metal cylinder 21 is cut away in the perspective view of FIG. 18 in order to make it more comprehensible.

Next, nozzles of dispensers 40 are inserted from both sides of the ceramic substrate 22 through gaps in the openings 33 as shown in FIG. 18. A predetermined amount of the inorganic filler 25 is then injected into spaces provided among the metal cylinder 21, the ceramic substrate 22, and the inorganic filler hardening jig 35a. The inorganic filler 25 is hardened under this condition at 150° C. in a constant temperature oven. The substrate fixing jigs 34 and the inorganic filler hardening jig 35a are removed after the above process. The both jigs 34 and 35a can be removed easily without adhesion of the inorganic filler 25, since they are made of Teflon or stainless steel with Teflon coated surfaces.

The foregoing manufacturing method could fix the ceramic substrate 22 securely in the metal cylinder 21. Although the above manufacturing method takes a process of inserting the inorganic filler hardening jig 35a into the metal cylinder 21 after fixing the ceramic substrate 22 with the substrate fixing jigs 34, the process may be reversed to attain completely same fixation of the ceramic substrate 22.

It was confirmed that the temperature sensor manufactured as above exhibits high yield, good output performance and reliability in the same level as that of the third exemplary embodiment, and also realizes a fast response.

In addition, a sensor of the third exemplary embodiment permits gases from the openings 33 into a direct contact with the resilient body 26 and allows corrosion if it is used for measuring temperature of corrosive gases or the like. However, the present exemplary embodiment, in which the inorganic filler 25 is arranged at the hinder end of the openings 33, can make the sensor capable to take temperature measurement even in corrosive gases, since the inorganic filler 25 prevents the gases from entering into an interior of the sensor.

Accordingly, the foregoing structure could realize temperature sensors with high yield.

As has been obvious from the foregoing descriptions, the present invention is able to provide a low-cost high-performance temperature sensor, without requiring use of expensive platinum wires for lead wires, with the structure including (a) a metal cylinder; (b) a ceramic substrate inserted in the metal cylinder, and provided with a temperature detecting element in a form of film and electrodes in a form of film for electrically tapping off an output of the temperature detecting element; (c) a supporting means having a function of reducing stress for supporting the ceramic substrate in the metal cylinder; and (d) a protective cap provided on one end of the metal cylinder for protecting the temperature detecting element provided on the ceramic substrate.

The invention can also provide a temperature sensor with high yield, because the ceramic substrate is supported in the metal cylinder by the supporting means having a stress-reducing function, thereby reducing stress to an entire body of the ceramic substrate, and avoiding disconnection from occurring.

What is claimed is:

1. A temperature sensor comprising:

a metal cylinder;

a ceramic substrate inserted into said metal cylinder;

a temperature detecting element in a form of a film disposed near a first end of said ceramic substrate;

an electrode in a form of a film electrically coupled to said temperature detecting element and;

a terminal, wherein a first end of said terminal is electrically connected to an end of said electrode, a second end of said ceramic substrate is fixed to said first end of said terminal and said terminal includes an expansion and contraction absorbing portion disposed between a second end and said first end of said terminal, said first end of said terminal being in a U-shape and said first end of said ceramic substrate being disposed in and fixed to said metal cylinder.

2. The temperature sensor according to claim 1, wherein said ceramic substrate is larger in length than said metal cylinder.

3. The temperature sensor according to claim 1, wherein a leading portion of said electrode is soldered with a lead wire, and the soldered portion is molded with resin.

4. The temperature sensor according to claim 3, wherein said resin comprises one of silicone and polyimide.

5. The temperature sensor according to claim 3, wherein said lead wire is covered by fluorocarbon polymers.

6. The temperature sensor according to claim 1, wherein said electrode includes platinum, and at least a portion thereof includes a conductive material containing glass.

7. The temperature sensor according to claim 6, wherein said conductive material containing glass comprises a composite of one of silver-palladium system and silver-palladium-platinum system.

8. The temperature sensor according to claim 1, wherein said temperature detecting element comprises one of platinum and thermistor.

9. The temperature sensor according to claim 1, wherein a portion in close proximity to said second end of said ceramic substrate is fixed to a portion near an end of said metal cylinder and a space between said ceramic substrate and said metal cylinder is filled with an inorganic material.

10. The temperature sensor according to claim 9, wherein said resilient body is formed of one of silicone and polyimide.

11. The temperature sensor according to claim 1, wherein said expansion-and-contraction absorber comprises a curvature.

12. A The temperature sensor according to claim 1, wherein said terminal is made of stainless steel having a nickel-plated surface.

13. The temperature sensor according to claim 1, wherein a tip end of said terminal is shaped in one of a letter U and a letter Π, and a hinder end of said ceramic substrate is inserted and fixed thereto.

14. The temperature sensor according to claim 1, wherein a portion in a tip end of said terminal is provided with a notch.

15. The temperature sensor according to claim 1, wherein said metal cylinder is provided with an opening in a position corresponding to said temperature detecting element.

16. The temperature sensor according to claim 15, wherein said opening has an area greater than an area of said temperature detecting element.

17. The temperature sensor according to claim 1, wherein a second end of said ceramic substrate protrudes from an edge of said metal cylinder.

18. The temperature sensor according to claim 1, wherein said metal cylinder is composed of a nickel-chromium alloy.

19. The temperature sensor according to claim 1 wherein said expansion and contraction absorbing portion includes a curved portion.

20. The temperature sensor according to claim 6, wherein said conductive material containing glass includes a composite including silver and palladium or silver and palladium and platinum.

21. The temperature sensor of claim 15, wherein said opening has an area greater than an area of said temperature detecting element.

22. The temperature sensor according to claim 1, wherein said terminal is composed of stainless steel with a nickel-plated surface.

23. The temperature sensor according to claim 1, wherein a portion of said first end of said terminal includes a notched portion.

* * * * *